United States Patent
Cazier et al.

(10) Patent No.: US 7,126,639 B2
(45) Date of Patent: Oct. 24, 2006

(54) DIGITAL CAMERA PRINTING USER INTERFACE RESPONSIVE TO LOCATION

(75) Inventors: Robert P. Cazier, Fort Collins, CO (US); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 10/283,536

(22) Filed: Oct. 29, 2002

(65) Prior Publication Data

US 2004/0080619 A1 Apr. 29, 2004

(51) Int. Cl.
- H04N 5/222 (2006.01)
- H04N 5/225 (2006.01)
- H04N 5/76 (2006.01)
- H04N 5/73 (2006.01)

(52) U.S. Cl. ............... 348/370; 348/207.2; 348/231.3; 348/226.1; 348/333.02

(58) Field of Classification Search ............ 348/207.2, 348/231.3, 226.1, 370, 371
See application file for complete search history.

(56) References Cited

U.S. PATENT DOCUMENTS

| | | | |
|---|---|---|---|
| 6,078,826 A | 6/2000 | Croft et al. | |
| 6,085,098 A | 7/2000 | Moon et al. | |
| 6,295,085 B1 * | 9/2001 | Munson et al. | 348/226.1 |
| 6,501,518 B1 * | 12/2002 | Smith et al. | 348/425.3 |
| 6,504,571 B1 * | 1/2003 | Narayanaswami et al. | 348/231.99 |
| 6,618,553 B1 * | 9/2003 | Shiohara | 386/117 |
| 6,628,899 B1 * | 9/2003 | Kito | 396/56 |
| 6,710,818 B1 * | 3/2004 | Kasahara et al. | 348/607 |
| 2002/0119788 A1 | 8/2002 | Parupudi et al. | |
| 2002/0123373 A1 | 9/2002 | Kirbas et al. | |
| 2003/0030731 A1 * | 2/2003 | Colby | 348/231.3 |
| 2003/0081138 A1 * | 5/2003 | Hofer et al. | 348/362 |

FOREIGN PATENT DOCUMENTS

| | | |
|---|---|---|
| EP | 0859326 A3 | 8/1998 |
| EP | 0881817 B1 | 12/1998 |

OTHER PUBLICATIONS

Pending U.S. Appl. No. 10/002,355, Filed: Oct. 30, 2001, "A Method and Apparatus for Detecting the Presence of Artifical Illumination in a Scene," HP PDNO: 10016239-1. Inventors: Gregory V. Hofer and Jason E. Yost.
IBM Corp. (1998). Digital Cameral With Global Positioning Satellite to Record Location With Image.
Search Report dated Mar. 26, 2004 for GB 0325027.

* cited by examiner

Primary Examiner—Ngoc-Yen Vu
Assistant Examiner—Nicholas G. Giles

(57) ABSTRACT

A digital camera printing user interface automatically selects and presents sets of printing options for printing parameters such as printed image size and paper size in accordance with location information. The location information may comprise the current location of the digital camera or an indication of where an image to be printed was captured.

18 Claims, 5 Drawing Sheets

DIGITAL CAMERA PRINTING USER INTERFACE RESPONSIVE TO LOCATION

FIELD OF THE INVENTION

The present invention relates generally to digital cameras and more specifically to user interfaces for printing from a digital camera that is capable of connection with a printer.

BACKGROUND OF THE INVENTION

Some digital cameras are capable of direct connection with a printer, allowing images to be printed without connecting the camera to a personal computer (PC). Since digital cameras are sold in a world-wide market, they generally include options for printing parameters such as printed image size or paper size in both English and metric units. When both English and metric units are presented in a printing user interface, the user has potentially twice as many options from which to select. The larger number of choices combined with the limited navigational features of a digital camera user interface renders the selection of printing options tedious for the user.

It is thus apparent that there is a need in the art for an improved digital camera printing user interface.

SUMMARY OF THE INVENTION

A method for presenting printing options in a digital camera capable of connection with a printer is provided. The method presents the printing options on the display of the digital camera in accordance with location information. An associated digital camera apparatus for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Presenting printing options to a digital camera user is facilitated by automatically displaying a set of options for each printing parameter based on location information. The location information may be, for example, the current location of the digital camera acquired from a Global Positioning System (GPS) receiver integrated with the digital camera. If the current location is in the United States, for example, options for printing parameters such as printed image size and paper size may be presented in English units automatically. Displaying the options in English units only shortens the list of options and simplifies the selection of options for the user. If the GPS coordinates indicate the digital camera is in France, for example, the options may be presented in metric units automatically.

In a different embodiment, the location information may be whether a particular image to be printed (or an image related in some way to the image to be printed) was captured in a country using English units or metric units. Such information may be determined at the time the image is captured and stored with the image itself for later retrieval. One method for determining whether an image is being captured in an English-units country or a metric-units country is to detect the intensity variation ("flickering") of an artificial light source at a particular one of at least two predetermined rates. Common rates include 50 Hz and 60 Hz. Incandescent lights typically exhibit less intensity variation than fluorescent lights. The United States uses 60-Hz AC power. Europe uses 50-Hz AC power. Though normally not noticeable to the naked eye, this minute variation in intensity is detectable by the sensor array of a digital camera. Some digital cameras detect this flickering so that rapid exposures taken during autofocusing can be synchronized with the intensity fluctuations to increase the accuracy of the focus in the final exposure. In such a camera, the detected intensity variation frequency, 50 Hz or 60 Hz, may be stored with the captured image for subsequent use in selecting printing options (English or metric) when that image is printed.

The intensity variation detection technique just described may be extended to images captured outdoors by adding time as a parameter. A predetermined period may be programmed into the camera, or a user may specify the predetermined period. An image captured outdoors within that predetermined period of a prior image that was captured under artificial light may be tagged with location information accordingly. For example, if the predetermined period is defined to be one hour, an image captured outdoors within 45 minutes of a prior image that was captured under 50-Hz fluorescent lighting may be assumed to have been captured in a location using 50-Hz power. This location information may be stored with the outdoor image for later retrieval.

Figure 1:
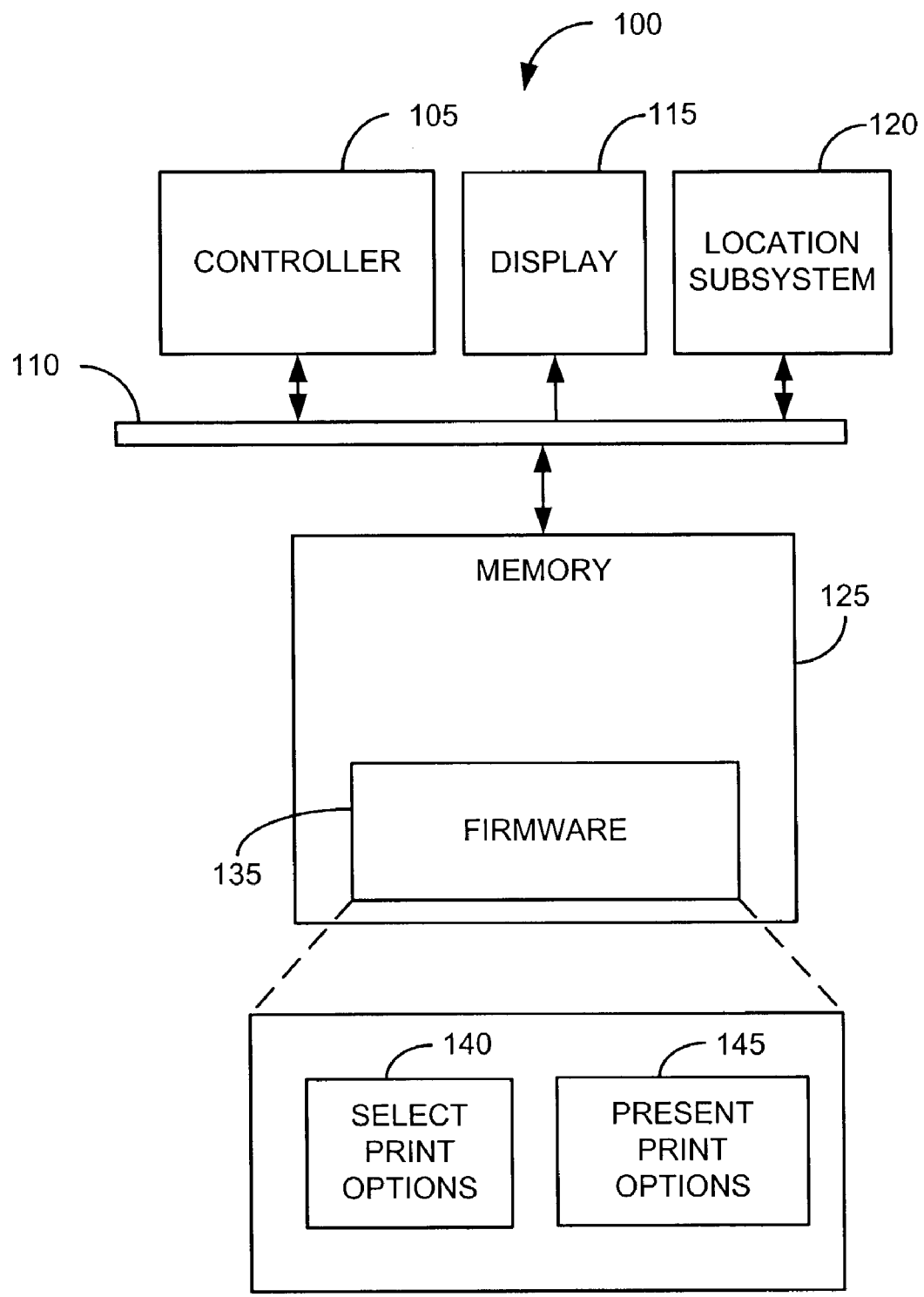
FIG. 1 is a functional block diagram of a digital camera in accordance with an illustrative embodiment of the invention.

FIG. 1 is a functional block diagram of a digital camera 100 in accordance with an illustrative embodiment of the invention. In FIG. 1, controller 105 communicates over data bus 110 with display 115, location subsystem 120, and memory 125. Location subsystem 120 may comprise a GPS receiver, which is well known in the art.

In a different embodiment, location subsystem 120 may comprise a module to detect whether images are captured under artificial lighting and, if so, to determine whether the artificial light source is varying in intensity at 50 Hz or 60 Hz. This module may be implemented in hardware, firmware, software, or any combination thereof. Methods and associated apparatuses for detecting the 50- or 60-Hz intensity variation of an artificial light source are described in U.S. patent application Ser. No. 10/002,355, "A Method and Apparatus for Detecting the Presence of Artificial Illumination in a Scene," inventors Gregory V. Hofer et. al., which is hereby incorporated by reference. In general, location subsystem 120 may comprise any location detection mechanism or technique.

Memory 125 in FIG. 1 may comprise any combination of volatile or nonvolatile memory, removable or non-removable memory, including, but not limited to, dynamic random access memory (DRAM), synchronous dynamic random access memory (SDRAM), magnetic disk, electrically erasable programmable read-only memory (EEPROM), or read-only memory (ROM). Nonvolatile memory may be used to store one or more digital images. Memory 125 may contain firmware 135, which may be stored in RAM, ROM, or any combination thereof. Firmware 135, as part of a printing user interface, may comprise Module Select Print Options 140 and Present Print Options 145. Module Select Print Options 140 selects a set of printing options (e.g., English or metric) for each of at least one printing parameters in accordance with the location information received from location subsystem 120. Module Present Print Options 145 presents the selected sets of printing options on display 115 in the context of the printing user interface.

Digital camera 100 may be connected with a printer in a variety of ways. First, digital camera 100 may be directly connected with the printer via a cable, RF link (e.g., Bluetooth™ or IEEE 802.11), infrared (IR) link, or the Internet. Secondly, digital camera 100 may store image data and associated printing instructions on a removable memory card based on a standard such as the digital print order format (DPOF). This removable memory may then be connected with a printer, which executes the instructions stored on the memory card. Thirdly, digital camera 100 may be connected with a personal computer (PC) via a docking station, and the PC may in turn be connected with the printer.

FIGS. 2A–2D are illustrations showing the presentation, based on location information, of printing options on display 115 of digital camera 100 in accordance with an illustrative embodiment of the invention. Each illustration is shown in the context of a user interface in which the user may select a particular printing parameter 205 to adjust by vertically scrolling through a list on display 115. Once a printing parameter 205 has been selected (e.g., highlighted), the user may choose an option for the selected printing parameter 205 by vertically scrolling through a drop-down menu 215 containing a set of printing options 210.

Figure 2A:
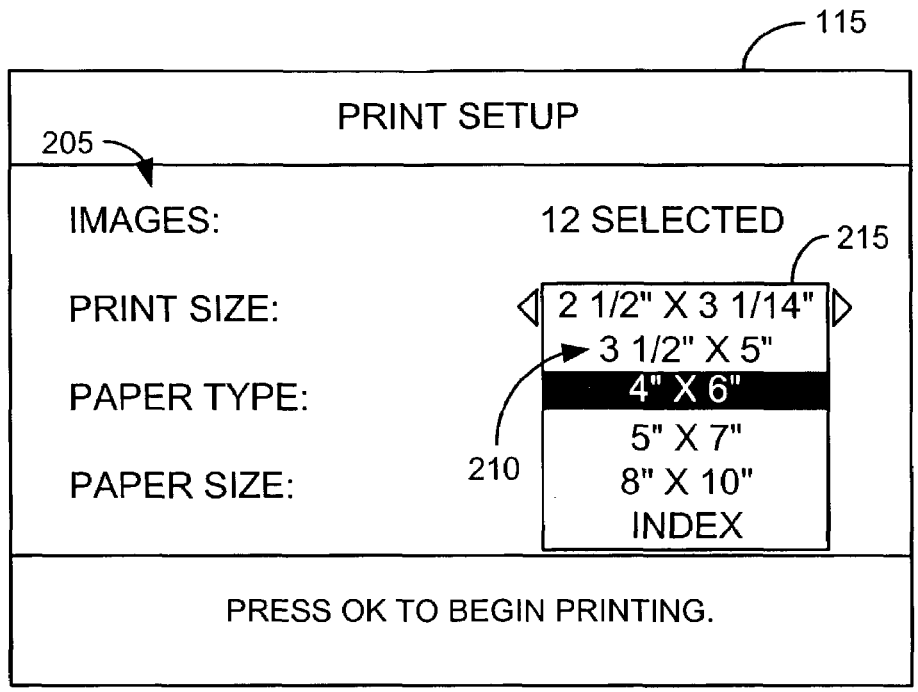
FIGS. 2A–2D are illustrations showing the presentation, based on location information, of printing options on the display of the digital camera shown in FIG. 1 in accordance with an illustrative embodiment of the invention.

In FIG. 2A, a set of printing options 210 for printed image size ("Print Size" in FIG. 2A) is presented in English units automatically in drop-down menu 215 in accordance with location information received from location subsystem 120.

Figure 2B:
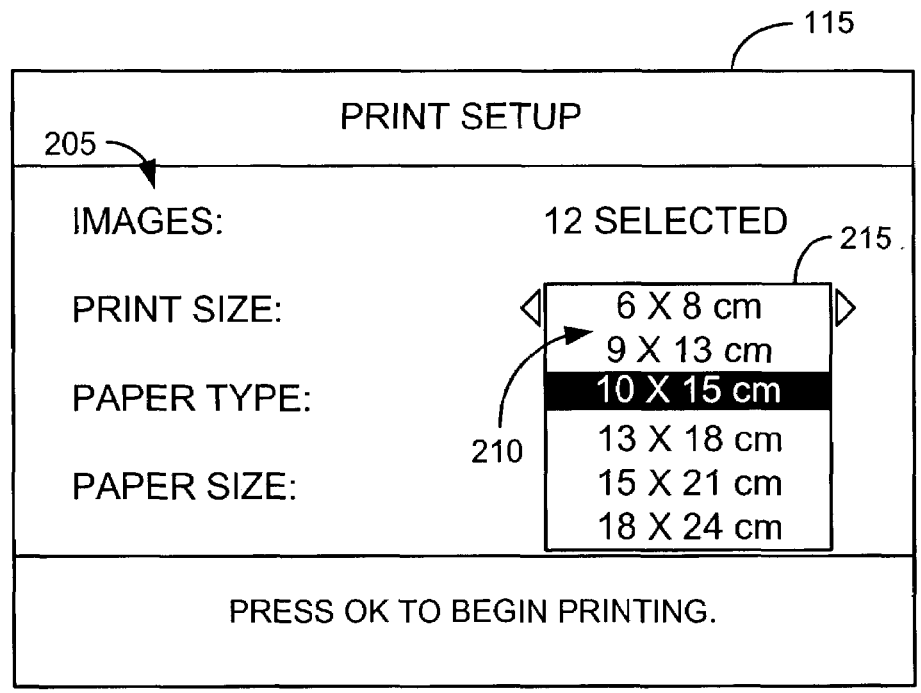

In FIG. 2B, a set of printing options 210 for printed image size ("Print Size" in FIG. 2B) is presented in metric units automatically in drop-down menu 215 in accordance with location information received from location subsystem 120.

Figure 2C:
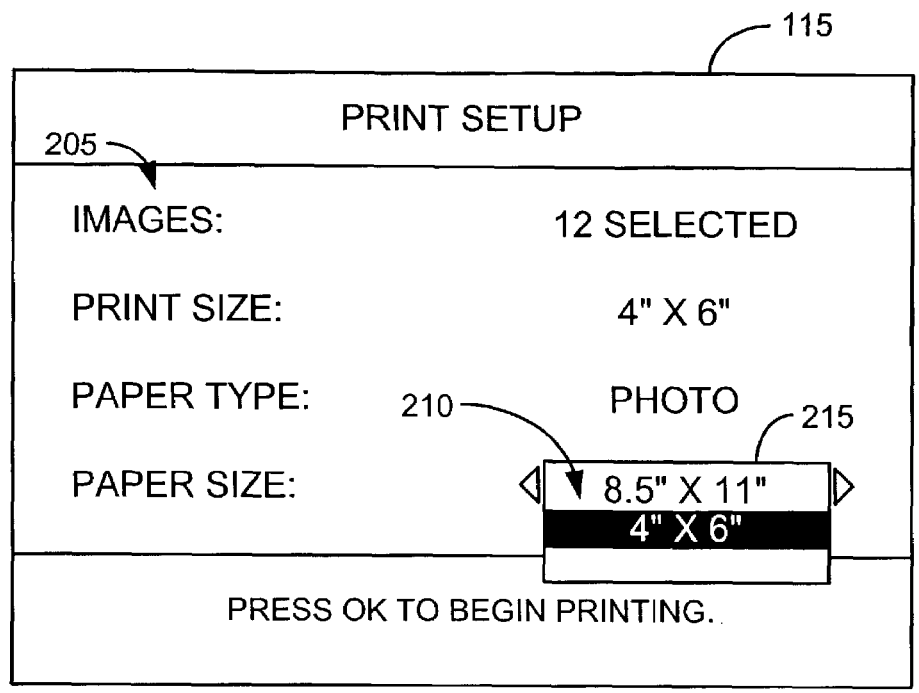

In FIG. 2C, a set of printing options 210 for paper size is presented in English units automatically in drop-down menu 215 in accordance with location information received from location subsystem 120.

Figure 2D:
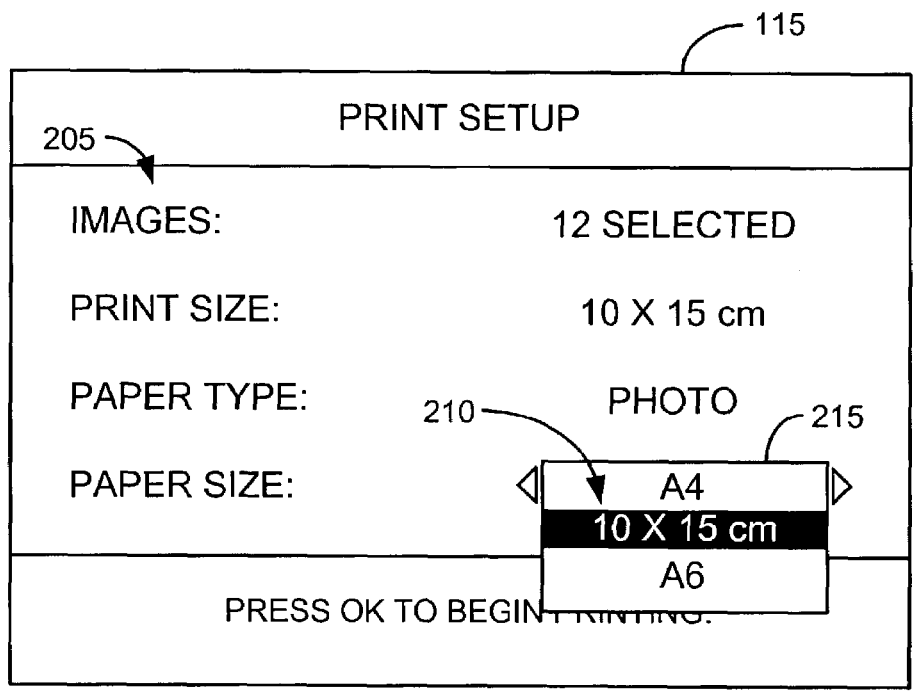

In FIG. 2D, a set of printing options 210 for paper size is presented in metric units automatically in drop-down menu 215 in accordance with location information received from location subsystem 120.

Figure 3:
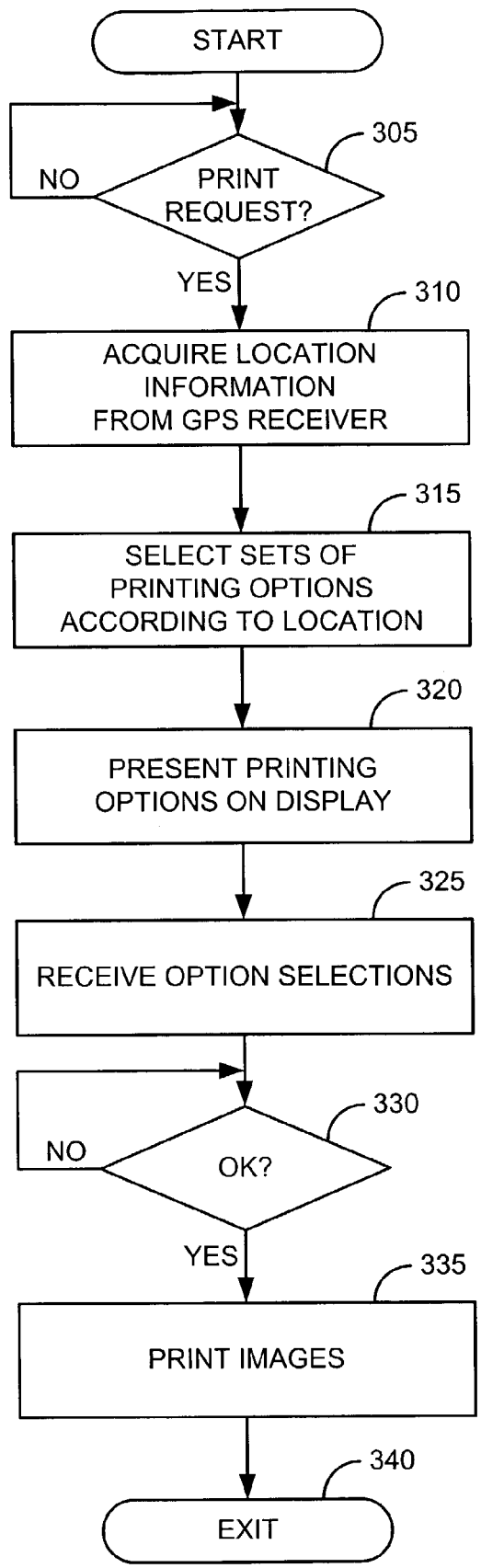
FIG. 3 is a flowchart of the operation of the digital camera shown in FIG. 1 in accordance with an illustrative embodiment of the invention.

FIG. 3 is a flowchart of the operation of digital camera 100 in accordance with an illustrative embodiment of the invention. At 305, a request to print one or more images stored in digital camera 100 invokes printing user interface program code residing in firmware 135. At 310, the current location of digital camera 100 is acquired from location subsystem 120. In this particular embodiment, location subsystem 120 comprises an integrated GPS receiver. Once the current location of digital camera 100 has been determined, a set of printing options 210 for each of at least one printing parameters 205 (e.g., printed image size and paper size) may be selected at 315 by Module Select Print Options 140. For example, if the GPS coordinates indicate that digital camera 100 is in the United States, option sets 210 in English units are selected (see FIGS. 2A and 2C). If the GPS coordinates indicate that digital camera 100 is in Germany, option sets 210 in metric units are instead selected (see FIGS. 2B and 2D). At 320, the selected sets of printing options 210 are presented on display 115 by Module Present Print Options 145. In FIGS. 2A–2D, drop-down menus are illustrated, but other user interface types are also possible. For example, selection of printed image size or paper size options may be performed using "radio buttons" instead of pull-down menus. Once the user's specific option choices have been received at 325 and a suitable input control (e.g., an "Ok" button) on digital camera 100 has been actuated at 330, the selected images may be printed at 335. The process may then terminate at 340.

Figure 4:
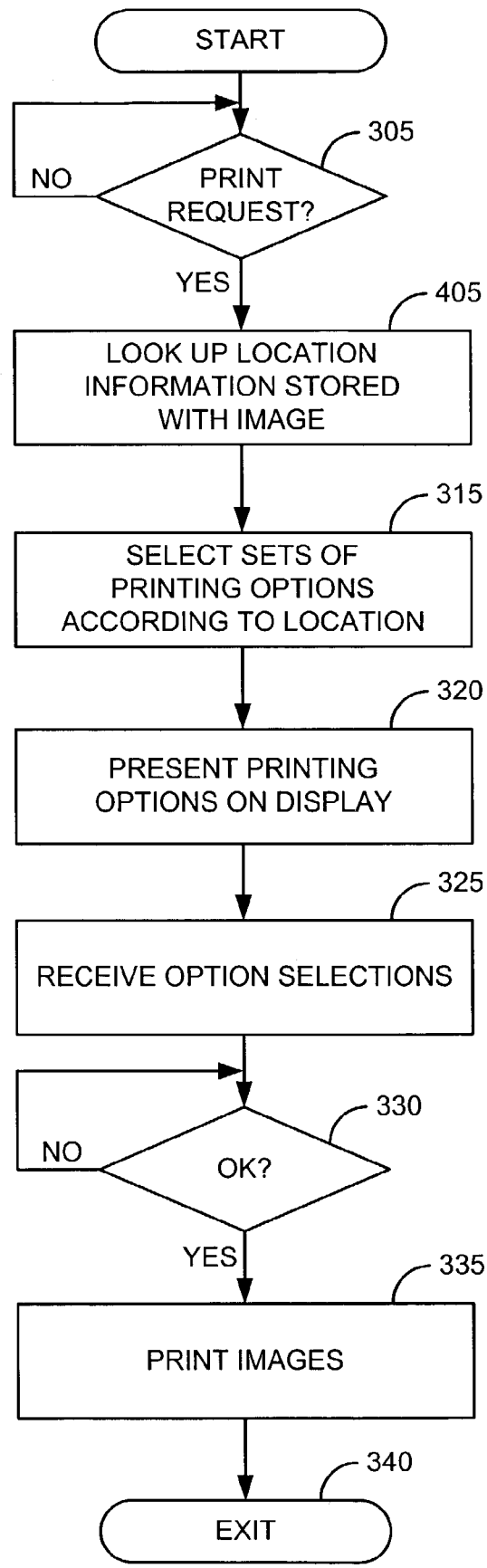
FIG. 4 is a flowchart of the operation of the digital camera shown in FIG. 1 in accordance with another illustrative embodiment of the invention.

FIG. 4 is a flowchart of the operation of digital camera 100 in accordance with another illustrative embodiment of the invention. The flowchart of FIG. 4 is the same as that in FIG. 3 except that the location information acquired at 405 comprises information stored with one or more images to be printed instead of GPS coordinates indicating the current location of digital camera 100. The location information stored with an image may indicate whether that image was captured in the presence of an artificial light source varying in intensity at a particular one of at least two predetermined rates (e.g., 50 Hz or 60 Hz). Alternatively, the location information stored with an image may be derived from a prior image that was captured within a predetermined period earlier in time in the presence of an artificial light source varying in intensity at a particular one of at least two predetermined rates (e.g., 50 Hz or 60 Hz). In this case, the same location information (English-units country or metric-units country) associated with the prior image may be applied to the later image. The predetermined period may be pre-programmed into digital camera 100 or specified by a user. In this embodiment, the location information may be represented advantageously using a single bit in memory (e.g., logic "0"=50 Hz; logic "1"=60 Hz). As explained above, a 60-Hz intensity variation rate indicates the selection of printing option sets 210 having English units at 315. A 50-Hz intensity variation indicates the selection of printing option sets 210 having metric units at 315.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for presenting printing options in a digital camera capable of connection with a printer, comprising:

acquiring location information automatically, wherein acquiring location information automatically comprises determining that a digital image stored in the digital camera was captured under the illumination of an artificial light source varying in intensity at a particular one of at least two predetermined rates;

selecting a set of printing options for each of at least one printing parameters in accordance with the acquired location information; and presenting the at least one set of printing options on a display of the digital camera.

2. The method of claim 1, wherein acquiring location information automatically further comprises obtaining, from a GPS receiver integrated with the digital camera, GPS coordinates corresponding to the current location of the digital camera.

3. The method of claim 1, wherein the at least two predetermined rates comprise 50 Hz and 60 Hz.

4. The method of claim 1, wherein acquiring location information automatically comprises determining that a digital image stored in the digital camera was captured within a predetermined period after a prior digital image was captured, the prior digital image having been captured under the illumination of an artificial tight source varying in intensity at a particular one of at least two predetermined rates.

5. The method of claim 4, wherein the at least two predetermined rates comprise 50 Hz and 60 Hz.

6. The method of claim 1, wherein the at least one printing parameters comprise image size and paper size.

7. A digital camera capable of connection with a printer, comprising:
   a display;
   a location subsystem to acquire location information automatically, wherein the location subsystem is configured to determine that a digital image stored in the digital camera was captured under the illumination of an artificial light source varying in intensity at a particular one of at least two predetermined rates;
   a printing options selection module to select a set of printing options for each of at least one printing parameters in accordance with the location information acquired from the location subsystem; and
   a presentation module to present the at least one set of printing options on the display.

8. The digital camera of claim 7, wherein the location subsystem comprises a GPS receiver, the GPS receiver providing geographic coordinates corresponding to the location of the digital camera.

9. The digital camera of claim 7, wherein the at least two predetermined rates comprise 50 Hz and 60 Hz.

10. The digital camera of claim 7, wherein the location subsystem is configured to determine that a digital image stored in the digital camera was captured within a predetermined period after a prior digital image was captured, the prior digital image having been captured under the illumination of an artificial light source varying in intensity at a particular one of at least two predetermined rates.

11. The digital camera of claim 10, wherein the at least two predetermined rates comprise 50 Hz and 60 Hz.

12. The digital camera of claim 7, wherein the at least one printing parameters comprise image size and paper size.

13. A digital camera capable of connection wit a printer, comprising:
   display means;
   means for acquiring location information automatically, wherein the means for acquiring location information automatically is configured to determine that a digital image stored in the digital camera was captured under the illumination of an artificial light source varying in intensity at a particular one of at least two predetermined rates;
   means for selecting a set of printing options for each of at least one printing parameters in accordance with the location information acquired from the means for acquiring location information automatically; and
   means for presenting the at least one set of printing options on the display means.

14. The digital camera of claim 13, wherein the means for acquiring location information automatically comprises a GPS receiver, the GPS receiver providing geographic coordinates corresponding to the location of the digital camera.

15. The digital camera of claim 13, wherein the at least two predetermined rates comprise 50 Hz and 60 Hz.

16. The digital camera of claim 13, wherein the means for acquiring location information automatically is configured to determine that a digital image stored in the digital camera was captured within a predetermined period after a prior digital image was captured, the prior digital image having been captured under to illumination of an artificial light source varying in intensity at a particular one of at least two predetermined rates.

17. The digital camera of claim 16, wherein the at least two predetermined rates comprise 50 Hz and 60 Hz.

18. The digital camera of claim 13, wherein teat least one printing parameters comprise image size and paper size.

* * * * *

UNITED STATES PATENT AND TRADEMARK OFFICE
CERTIFICATE OF CORRECTION

PATENT NO. : 7,126,639 B2
APPLICATION NO. : 10/283536
DATED : October 24, 2006
INVENTOR(S) : Robert P. Cazier et al.

It is certified that error appears in the above-identified patent and that said Letters Patent is hereby corrected as shown below:

In column 5, line 15, in Claim 4, delete "tight" and insert -- light --, therefor.

In column 6, line 9, in Claim 13, delete "wit" and insert -- with --, therefor.

In column 6, line 37, in Claim 16, delete "to" and insert -- the --, therefor.

In column 6, line 42, in Claim 18, delete "teat" and insert -- the at --, therefor.

Signed and Sealed this

Fifth Day of May, 2009

JOHN DOLL
*Acting Director of the United States Patent and Trademark Office*